(12) United States Patent
Elmore et al.

(10) Patent No.: US 9,221,959 B2
(45) Date of Patent: Dec. 29, 2015

(54) STORAGE STABLE WATER BASED EPOXY-AMINE CURABLE SYSTEMS

(75) Inventors: Jim Elmore, Houston, TX (US); Pascale Claeys-Bouuaert, Brussels (BE); Françoise Heine, Dion-Valmont (BE)

(73) Assignee: HEXION INC., Columbus, OH (US)

( * ) Notice: Subject to any disclaimer, the term of this patent is extended or adjusted under 35 U.S.C. 154(b) by 168 days.

(21) Appl. No.: 13/580,568

(22) PCT Filed: Mar. 4, 2011

(86) PCT No.: PCT/US2011/027200
§ 371 (c)(1),
(2), (4) Date: Oct. 12, 2012

(87) PCT Pub. No.: WO2011/112452
PCT Pub. Date: Sep. 15, 2011

(65) Prior Publication Data
US 2013/0072597 A1  Mar. 21, 2013

(30) Foreign Application Priority Data

Mar. 10, 2010 (EP) .................................. 10002471

(51) Int. Cl.
| | |
|---|---|
| *C08G 59/46* | (2006.01) |
| *C08G 59/54* | (2006.01) |
| *C08G 59/56* | (2006.01) |
| *C08K 3/08* | (2006.01) |
| *C08K 3/20* | (2006.01) |
| *C08L 63/00* | (2006.01) |
| *C08L 63/02* | (2006.01) |
| *C08L 63/04* | (2006.01) |
| *C08K 5/17* | (2006.01) |
| *C08G 59/18* | (2006.01) |
| *C09D 163/00* | (2006.01) |
| *C09J 163/00* | (2006.01) |
| *C08K 3/10* | (2006.01) |

(52) U.S. Cl.
CPC ............... *C08K 5/17* (2013.01); *C08G 59/182* (2013.01); *C08G 59/184* (2013.01); *C08L 63/00* (2013.01); *C09D 163/00* (2013.01); *C09J 163/00* (2013.01); *C08K 3/10* (2013.01)

(58) Field of Classification Search
None
See application file for complete search history.

(56) References Cited

U.S. PATENT DOCUMENTS

| | | | | |
|---|---|---|---|---|
| 4,116,900 | A | * | 9/1978 | Belanger ...................... 523/404 |
| 4,229,335 | A | * | 10/1980 | Ting et al. .................... 523/416 |
| 4,417,007 | A | | 11/1983 | Salensky et al. |
| 4,605,690 | A | * | 8/1986 | Debroy et al. ................ 523/414 |
| 4,608,405 | A | * | 8/1986 | DeGooyer .................... 523/404 |
| 4,956,411 | A | * | 9/1990 | Tada et al. ....................... 528/93 |
| 5,508,324 | A | | 4/1996 | Cook |
| 6,077,884 | A | | 6/2000 | Hess et al. |
| 6,127,459 | A | | 10/2000 | Stark et al. |
| 2004/0258922 | A1 | | 12/2004 | Willett et al. |
| 2005/0120671 | A1 | | 6/2005 | Rooshenas |
| 2009/0068473 | A1 | | 3/2009 | Van Wessel et al. |

FOREIGN PATENT DOCUMENTS

| | | |
|---|---|---|
| EP | 1443068 | 8/2004 |
| WO | WO 2007/106214 A2 | 9/2007 |

OTHER PUBLICATIONS

Momentive Heloxy Epoxy Functional Modifiers, 2011, pp. 1-8.*
Hexion EPON Resin 828, 2005, pp. 1-8.*
Disparlon Product Data Sheet, King Industries, 2005, two pages.*

* cited by examiner

Primary Examiner — Robert Sellers

(57) ABSTRACT

The invention relates to non aqueous curing agents for water dispersed epoxy resins. The curing agent composition offers a binder pot life of several hours, and in the presence of a metal, such as zinc, nearly no hydrogen generation is observed. The present curing composition can be mixed with a metal powder to provide a storage stable paste. The curing agent composition and/or paste is fully compatible with an epoxy water based resin. After low shear blending, the epoxy curing agent and metal system is storage stable for several hours working pot life that provides for cured coatings having good performance.

20 Claims, No Drawings

STORAGE STABLE WATER BASED EPOXY-AMINE CURABLE SYSTEMS

This invention relates to water free curing agents for water dispersed epoxy resins. In one aspect, the invention relates to curing agents suitable for use in waterborne applications.

Epoxy coating systems cured with polyamine-based curing agents are used for the preparation of industrial maintenance coatings and other types of protective coatings for a variety of substrates. Epoxy resins have excellent resistance to chemicals. They also have good adhesion to most substrates; i.e., various woods, wall-boards, metals and masonry surfaces. In the case of high corrosion resistance, zinc rich filled epoxy amine systems are often used.

There has long been a desire to formulate a coating system with very low volatile organic compounds content (VOC's), which is applied and curable at a wide range of temperatures, and in the absence of external inhibitors or accelerators if possible. In the case of the presence of zinc in a waterborne coating system, applicators have to solve the problem of hydrogen generation due to the reaction between zinc and water.

Many of the current waterborne epoxy resin and curing agent formulated systems are faced with the problem of poor pot life. In the presence of a metal, such as zinc, it is even more difficult for such systems, containing the epoxy part, the curative part and the metal to have an acceptable pot life. It would be desirable to provide a curing agent for a waterborne coating system which is compatible with the epoxy part and that in the presence of a metal, such as zinc, the generation of hydrogen is reduced or at least kept to a low level. Thus an epoxy resin system with a desirable application working life and with good substrate protection is required. Such a coating system must have a pot life of at least one working shift in duration; i.e., 4 to 12 hours, preferably around 8 hours.

The present invention provides a curing agent composition which offers a binder pot life of several hours (between 4 and 24 hours), and in the presence of a metal such as zinc, nearly no hydrogen generation is observed. The curing agent composition comprises epoxy amine adducts with nearly no primary amine, an amine with hydrophilic backbone such as polyalkyleneglycol moieties, amines, polyamines or polyamidoamines with a hydrophobic alkyl backbone, hydrophobic hydrocarbon resins, wetting agents and silane derivatives. The present curing composition can be mixed with a metal powder, such as zinc, to provide a stable paste. The present curing agent composition and/or paste is fully compatible with an epoxy water based resin. After low shear blending, the system is storage stable for several hours (typically >4).

In addition to providing a water compatible curing agent, the curing agent should be readily compatible with a waterborne epoxy resin in order to make a coating having good mechanical and corrosion resistance properties. The problem of balancing reactivity and working life in these systems is more acute where the curing agent primary amine groups have been converted to secondary amine groups.

It is therefore desirable to obtain curing agents that are water compatible and provide cured products with good mechanical and corrosion resistance properties.

In one embodiment, the curing agent of the invention, useful for epoxy resins, includes:

(a) a first amine adduct, which is a reaction product of an amine-terminated intermediate and a monofunctional epoxy compound, wherein the amine-terminated intermediate is prepared by reacting at least one polyamine or polyamidoamine, having at least 3 active amine hydrogen atoms per molecule, and at least one epoxy resin having a functionality of at least 1.5, in an epoxy functionality equivalents to polyamine or polyamidoamine mole ratio of 0.9:1 to 1:10, the excess of the polyamine or polyamidoamine being eliminated, and wherein the monofunctional epoxy compound is present in an amount calculated to react away the primary amines still present in the amine-terminated intermediate, (b) an optional second amine adduct, which is prepared from a cycloaliphatic alkyl amine or polyamine and an epoxy compound, (c) a sterically hindered hydrophobic alkyl amine or diamine, or a hydrocarbon resin, (d) a component having amino or polyamino polyalkyleneglycol moieties and/or a medium to low molecular weight amino silane, wherein the viscosity is optionally adjusted by a solvent such as alkyl glycol monoalkyl ethers and alkyl aryl alcohol, and (e) optionally a metal powder.

In another embodiment, the reaction product of the amine-terminated intermediate and the monofunctional epoxy compound, component (a) above, is present in an amount of 2-15 weight percent ("wt %") based on the total weight of the curing agent.

In another embodiment, the optional second amine adduct, component (b) above, when utilized, is present in an amount of 2-20 wt %, preferably 5-15 wt %, based on the total weight of the curing agent.

In another embodiment, the sterically hindered hydrophobic alkyl amine or diamine and/or the hydrocarbon resin, component (c) above, is present in a total amount of 2-30 wt %, based on the total weight of the curing agent.

In another embodiment, the component having amino or polyamino polyalkleneglycol moieties is used in an amount of 2-20 wt %, and/or the amino silane is used in an amount of 3-10 wt %, component (d) above, with wt % based on the total weight of the curing agent.

A well known metal powder used in the paint industry is zinc which leads to zinc rich formulations that are used for their outstanding corrosion performances on steel. Zinc metal powder is typically present in an amount of 15-80 wt %, 30-75 wt % or 50-70 wt %, based on the weight of the wet paint or coating composition, or 15-95 wt %, based on the weight of the dry applied and cured paint.

In another embodiment, the curing agents of the inventions may be utilized in water based epoxy resin formulations, which formulations will be useful in the manufacture of paints, adhesives or sizings.

In another embodiment, the curing agent of the invention, useful for epoxy resins, is prepared by (a) reacting at least one polyamine or polyamidoamine, having at least 3 active amine hydrogen atoms per molecule, and at least one epoxy resin having a functionality of at least 1.5, in an epoxy functionality equivalents to polyamine or polyamidoamine mole ratio of 0.9:1 to 1:10 to produce an amine-terminated intermediate, removing any excess of polyamine or polyamidoamine, then further reacting the amine-terminated intermediate with a monofunctional epoxy compound in an amount calculated to react away primary amines in the amine-terminated intermediate to prepare a first amine adduct, (b) optionally adding the first amine adduct obtained in step (a) with a second amine adduct obtained by partially reacting a cycloaliphatic alkyl amine or polyamine with an epoxy compound to obtain an amine adduct blend, (c) adding a sterically hindered hydrophobic alkyl amine or diamine, and/or a hydrocarbon resin to the first amine adduct of step (a) or to the amine adduct blend of step (b) to obtain a second blend, (d) further adding a component having amino or polyamino polyalkyleneglycol moieties and/or a medium to low molecular weight amino silane to the second blend obtained in step (c) to form a third blend, and (e) optionally adding a metal powder to the third blend.

The above curing agent of the invention, or metal pastes thereof, are stable for a long period. In cases of these curing agent paste formulations, nearly no hydrogen generation is measured during these long periods.

Various types of aliphatic, cycloaliphatic, modified fatty acid and aromatic amines and their combinations could be used for composition of the curing agents. Aliphatic amines such polyoxyalkelene, polyalkylene, arylyl amines, ketimines, cyanoethylated and mannich based amine are common subclasses of examples. Polyamides, polyamide/imadozolines, amidoamines and amidoamine/imidazolines are some of the modified fatty acid examples.

The preferred polyamine in component(a) include, for example, m-xylylenediamine, 1,3-bisaminomethylcyclohexane, 2-methyl-1,5-pentanediamine, 1-ethyl-1,3-propanediamine, ethylenediamine, diethylenetriamine (DETA), triethylenetetramine (TETA), polyoxypropylenediamines, 2,2(4),4-trimethyl-1,6-hexanediamine, isophorone diamine, 2,4(6)-toluenediamine, 1,6-hexanediamine, 1,2diaminocyclohexane and para-aminodicyclohexyl methane (PACM).

The epoxy resins used in component (a) producing the curing agent can be any reactive epoxy resin having a 1,2-epoxy equivalency (functionality), on the average, at least 1.3, preferably at least 1.6, to preferably to about 8 epoxide groups, to most preferably 3 to 5 epoxide groups per molecule. The epoxy resin can be saturated or unsaturated, linear or branched, aliphatic, cycloaliphatic, aromatic or heterocyclic, and may bear substituents which do not materially interfere with the reaction with the oxirane. Such substituents can include bromine or fluorine. They may be monomeric or polymeric, liquid or solid, but are preferably liquid or a low melting solid at room temperature. Suitable epoxy resins include glycidyl ethers prepared by reacting epichlorohydrin with a compound containing at least 1.5 aromatic hydroxyl groups carried out under alkaline reaction conditions. Examples of other epoxy resins suitable for use in the invention include diglycidyl ethers of dihydric compounds, epoxy novolacs and cycloaliphatic epoxies.

Preferably the epoxy resin is a diglycidyl ether of a dihydric phenol, diglycidyl ether of a hydrogenated dihydric phenol, an aliphatic glycidyl ether, epoxy novolac or a cycloaliphatic epoxy.

Diglycidyl ethers of dihydric phenols can be produced, for example, by reacting an epihalohydrin with a dihydric phenol in the presence of an alkali. Examples of suitable dihydric phenols include: 2,2-bis(4-hydroxyphenyl) propane (bisphenol-A);2,2-bis 4-hydroxy-3-tert-butylphenyl) propane; 1,1-bis(4-hydroxyphenyl) ethane; 1,1-bis(4-hydroxyphenyl) isobutane; bis(2-hydroxy-l-naphthyl) methane; 1,5 dihydroxynaphthalene; 1,1-bis(4-hydroxy-3-alkylphenyl) ethane and the like. Suitable dihydric phenols can also be obtained from the reaction of phenol with aldehydes such as formaldehyde (bisphenol-F). Diglycidyl ethers of dihydric phenols include advancement products of the above diglycidyl ethers of dihydric phenols with dihydric phenols such as bisphenol-A, such as those described in U.S. Pat. Nos. 3,477,990 and 4,734,468.

Commercial available examples of preferred epoxy resins include EPON Resins DPL-862, 828, 826, 825, 1001, 1002, SU3, 154, 1031, 1050, 133, 165, EPONEX Resin 1510 and the like. HELOXY Modifiers include 32, 44, 48, 56, 67, 68, 71, 84, 107, and 505 all available from Momentive Specialty Chemicals Inc. Other commercially available examples of epoxy resins include DEN 431, 438, ERL-4221, -4289,-4299, -4234 and -4206 all available from the Dow Chemical Company.

The epoxide capping agent used in component (b) can be an aliphatic, alicyclic, or aromatic compound attached to the epoxy functional group. Reacting the primary amine hydrogen reduces the chance for carbonate and carbamate formation from atmospheric carbon dioxide and moisture reacting with the primary amine hydrogen atoms, appearing as a blush on the coating and leading to poor coating chemical resistance. In addition to reducing the effect of blushing by reacting out some or all of the primary amine groups on the substituted aryl aminopolyamine, reacting the aminopolyamine with an epoxy functional group has the advantage of leaving the one free amine hydrogen active for reaction with epoxy groups. Reacting the primary amine on the aminopolyamine compound with epoxy functionality, however, leaves the capped secondary amine compound more compatible with an epoxy resin. Thus, one can achieve the dual advantage of reducing blush while retaining sufficient reactivity and compatibility to coalesce and cure the system at ambient temperatures in the presence of water and absence of external catalysts. Reaction with a monoepoxide capping agent also leads to the formation of a hydroxyl group, which would also be available to react with another ether and/or ester forming compounds. Acrylated epoxies could also be used as capping agents.

These primary amine capping categories of epoxies include the unsaturated epoxy hydrocarbons of butylene, cyclohexene, styrene oxide and the like; epoxy ethers of monovalent alcohols such as methyl, ethyl, butyl, 2-ethylhexyl, dodecyl alcohol and others; epoxides of the alkylene oxide adducts of alcohols having at least 8 carbon atoms by the sequential addition of alkylene oxide to the corresponding alkanol (ROH), such as those marketed under the tradename NEODOL; epoxy ethers of monovalent phenols such as phenol, cresol, and other phenols substituted in the o-, m-, or p-positions with $C_1$-$C_{21}$ branched or unbranched alkyl, aralkyl, alkaryl, or alkoxy groups such as nonylphenol; glycidyl esters of monocarboxylic acids such as the glycidyl ester of caprylic acid, the glycidyl ester of capric acid, the glycidyl ester of lauric acid, the glycidyl ester of stearic acid, the glycidyl ester of arachidic acid and the glycidyl esters of alpha, alpha-diallyl monocarboxylic acids described in U.S. Pat. No. 3,178,454, epoxy esters of unsaturated alcohols or unsaturated carboxylic acids such as the glycidyl ester of neodecanoic acid, epoxidized methyl oleate, epoxidized n-butyl oleate, epoxidized methyl palmitoleate, epoxidized ethyl linoleate and the like; phenyl glycidyl ether, allyl glycidyl ethers, and acetals of glycidaldehyde.

Specific examples of monoepoxide capping agents useful to the practice of the invention include alkyl glycidyl ethers with 1-18 linear carbon atoms in the alkyl chain such as butyl glycidyl ether or a mixture of $C_8$-$C_{14}$ alkyls, cresyl glycidyl ether, phenyl glycidyl ether, nonylphenylglycidyl ether, p-tert-butylphenyl glycidyl ether, 2-ethylhexyl glycidyl ether, and the glycidyl ester of neodecanoic acid.

Component (c) includes sterically hindered hydrophobic amines or polyamines such as CORSAMINE DO, available from Corsacana Technologies (or CHEMOS GmbH Germany, Feixiang Chemicals, Akzo), which CORSAMINE DO is an alkyl amine blend composed of oleyl amine and oleyl diamine. Component (c) may also include hydrocarbon resins such as Piccolastic A5, a polystyrene polymer, available from Eastman, hydrophobic Modaflow, available from Cytec, and/ or Disparlon L1980 series, available from King Industry, both Modaflow and Disparlon L1980 series are acrylic polymers.

The curative composition further includes component (d) which may be a component having amino or polyamino polyalkyleneglycol moieties, with a medium to low molecular weight, such as JEFFAMINE T3000, T5000, T403 or D2000, commercially available from Huntsman Chemical Company and/or Tiymeen 6607, available from Cognis or ETHOX TAM-20, available from ETHOX Chemicals.

Component (d) may also include an amino silane such as SILQUEST A 1120, available from Momentive Performance Materials Inc., Z-6020, available from Dow Corning, and/or KBM-603 available from ShinEtsu, all of SILQUEST A 1120, Z-6020, and KBM-603 are trimethoxyaminosilanes.

The viscosity of the curing agent of the invention may be optionally adjusted by means of solvent such as alkyl glycol monopropyl ethers, such as 2-propoxy-ethanol or alkyl aryl alcohol such as benzyl alcohol. The solvent may be present in an amount of 0-80 weight %, based upon the weight of the curing agent.

The curing agents of the invention can be used to effectively cure an aqueous epoxy resin system. Preferred examples of the aqueous epoxy resins are bisphenol-A and/or bisphenol-F based epoxy resins having from 350 to 10,000 molecular weight that are nonionically dispersed in water with or without glycol ether cosolvents. Commercial examples of the aqueous epoxy resins include, for example, Bisphenol A resins like EPI-REZ Resin 3510-W-60 (emulsion), EPI-REZ 3520-WY-55, EPI-REZ 3521-WY-53, EPI-REZ 6520-WH-53, EPI-REZ 3540-WY-55, EPI-REZ 3546-WH-53 (dispersions), Araldite PZ756/67 (Hunstman), EPI-REZ Resin 5522-WY-55, EPI-REZ Resin 6530-WH-53 and similar dispersions. EPI-REZ Resin 3510, 3520, 3521, 3522, 3540, 3546, 5522 and 6520 are available from Momentive Specialty Chemicals Inc. The curing agents of the invention are compatible with aqueous dispersions without using acid salts. These curable systems contain water, one or more epoxy resins and one or more curing agents of the invention. These aqueous curable epoxy resin systems can be further catalyzed with a commercially available tertiary amine accelerator, such as 2,4,6-tris(dimethyl aminomethyl phenol) or phenols to cure at lower temperatures. Examples of such materials are EPIKURE Curing Agent 3253 from Momentive Specialty Chemicals Inc., or DMP-30 from Rohm and Haas.

For the aqueous epoxy resin systems, the typical cure temperature with or without an accelerator ranges from 5° C. to 80° C. Typically these curing agents are used to formulate thermoset coatings that have good corrosion protection of the coated substrate. The water based epoxy resin formulations of the invention contain a volatile organic compound content below 300 g/l, preferably below 280 g/l and more preferably below 230 g/l.

These aqueous epoxy resin systems can serve as components of paints and coatings for application to substrates such as, for example, metal, wood, glass and cementatious structures. To prepare such paints and coatings, these resins are blended with primary, extender and anti-corrosive pigments, and optionally, additives such as surfactants, antifoam agents, rheology modifiers and mar and slip reagents. The selection and amount of these pigments and additives depends on the intended application of the paint and it is generally recognized by those skilled in the art. The wetting and dispersing properties of the above formulated water based epoxy and amine polymer system allows stable pigmented paint formulations.

The curing agents of the instant invention can also be used as components of adhesives, elastomers and fiber sizing applications.

Materials Used

EPON 828 is a diglycidyl ether liquid epoxy resin, commercially available from Momentive Specialty Chemicals Inc.

EPON 154 is a diglycidyl ether liquid epoxy resin, commercially available from Momentive Specialty Chemicals Inc.

TETA is triethylene tetramine commercially available from Dow Chemical having a typical amine value of about 1436 mg KOH/g.

DYTEK A is 2-methyl-pentyl diamine commercially available from Invista having a typical amine value of about 943 mg KOH/g.

HELOXY Modifier 62 is a commercial grade of ortho-cresol glycidyl ether available from Momentive Specialty Chemicals Inc. that is produced by treatment of ortho-cresol with epichlorohydrin and sodium hydroxide. HELOXY Modifier is a thin liquid having a viscosity at 25° C. of 7 centipoise and an epoxy equivalent weight of about 175 to about 195.

CARDURA Resin E10 is the glycidyl ester of a synthetic saturated monocarboxylic acid, commercially available from Momentive Specialty Chemicals Inc. CARDURA E10 is a thin liquid having a viscosity at 25° C. of 7.1 centipoise and an epoxy equivalent weight of about 250.

EPI-REZ Resin 3520 (an aqueous epoxy resin dispersion of diglycidylether of bisphenol-A having EEW of 535 g/eq) available from Momentive Specialty Chemicals.

EPI-REZ Resin 5522 (an aqueous modified epoxy resin dispersion of diglycidylether of bisphenol-A having EEW of 625 g/eq) available from Momentive Specialty Chemicals.

EPON, CARDURA, HELOXY are Momentive Specialty Chemicals Trade Names.

Test Methods

ASTM

D 2196 Viscosity, Brookfield viscosity
D 562 Consistency of Paints Using the Stormer Viscometer
D 3363 Film Hardness by Pencil Test
D 4366-95 Pendulum Hardness
D 2369 Volatile Content of Coatings
D 2369 Standard Test Method for Volatile Content of Coatings
D 523 Specular Gloss Clear Films
D 1308 Effect of Household Chemicals on Clear and Pigmented Organic Finishes
D 5895 Standard Test for Evaluating Drying or Film Formation of Organic Coatings
D 1640 Drying, Curing and Film Formation of Coatings at Room Temperature
B 499D Film Thickness by Use of a Mechanical Device
D 1186 Nondestructive Measurement of Dry Film Thickness
D 522 Mandrel Bend Test of Attached Coatings
D 1210-96 Hegman, fineness of grind
D 3359 Measuring Adhesion by Tape Test
D 2794 Resistance of Organic Coatings to the Effects of Rapid Deformation (Impact)
B 117-09 Standard Practice for Operating Salt Spray (Fog)

EPIKURE 3292 is an amine epoxy adduct of a multifunctional glycidyl ether of a phenol formaldehyde novolac reacted with a 3 moles (per epoxy group) blend of polyethylenepolyamines primarily composed of triethylenetetramine. This adduct is further reacted with the monoglycidyl ether of ortho cresol after the excess unreacted polyethylene-polyamines are removed. This is an example of component (a).

EPIKURE 3380 is an amine epoxy adduct of a difunctional glycidyl ether of bisphenol A and isophorone diamine. This is an example of component (a).

Corsamine DO is an alkyl amine blend composed of oleyl amine and oleyl diamine. This is an example of component (b).

Jeffamine T5000 is a liquid amine derived from branched polypropylene oxide from the following formula.

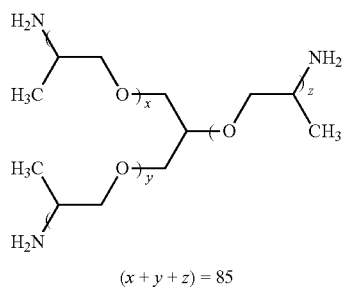

$(x + y + z) = 85$

This is an example of component (d).

Silquest A1120 is N(beta-aminoethy) gamma-aminopropyl trimethoxy silane. This is an example of component (d).

Trymeen 6607 is an ethoxylated tallow alkyl amine. This is an example of component (d).

Eastman EP is the monopropyl ether of ethylene glycol, which is a coupling agent and/or solvent.

Piccolastic A5 is a polystyrene polymer. This is an example of component (c).

Apparatus

ISO 3682-96 Acid Value

Particle Size

The determination of emulsion and dispersion particle sizes was accomplished with a Brookhaven Bi-DCP Particle Sizer from Brookhaven Instruments Corporation or a Beckman-Coulter LS Instrument. Dn is number average diameter particle size and Dw is mass average particle size. All particle size data is reported in microns, μ. Unless otherwise stated the particle sizes quoted for the dispersions herein are reported as Dn, number average particle size.

Weight per Epoxide (ASTM-D 1652-04)

The weight per epoxide (WPE or EEW) of all products was determined by drying a weighed amount of sample by means of azeotropic distillation with methylene chloride then titrating the residue by known methods and correcting for percent solids to determine the WPE at 100% solids content.

Amine Value

Defined as the milligrams of KOH equivalent to basic nitrogen content of a one-gram sample, determined by acid base titration.

Amine Equivalent Weight

Is defined as the weight required to react with one equivalent weight of epoxide and is determined from the amine nitrogen content in Momentive Test Method HC-715-88 and the known stoichiometry of the reactants in the resulting product containing nitrogen having reactive hydrogen that will react with epoxies under ambient conditions.

EXAMPLES

Ex 1 Curative According to the Invention

| Component | Weight (g) |
| --- | --- |
| EP154-TETA adduct, (a) | 99.66 |
| Heloxy 62, (a) | 112.46 |
| EPIKURE 3380, (b) | 95.82 |
| Corsamine DO, (c) | 44.88 |
| Jeffamine T5000, (d) | 73.60 |
| Silquest A1120, (d) | 22.64 |
| Trymen 6607, (d) | 62.46 |
| Eastman EP, a coupling agent/solvent | 190.00 |
| Piccolastic A5, (c) | 65.14 |
| Total Curing Agent | 766.67 |
| % Non Volatile | 67.29 |

| Component | Equivalent Wt. | Equivalents |
| --- | --- | --- |
| (a) EP154-TETA adduct, source of amine equivalents from a amine epoxy adduct from EP154, a phenol novolac epoxy resin and triethylenetetramine, TETA | 68.27 | 1.4598 |
| (a) Heloxy 62, epoxy equivalent source from a cresyl glycidyl ether | 185 | 0.6079 |
| Ratio of epoxy to polyamine/polyamido amine: 1:2.4 | | |

Ex 2 Curative According to the Invention

| Component | Weight (g) |
| --- | --- |
| EPIKURE 3292, (a) | 253.39 |
| Heloxy 62, (a) | 58.40 |
| EPIKURE 3380, (b) | 95.82 |
| Corsamine DO, (c) | 44.88 |
| Jeffamine T5000, (d) | 73.30 |
| Silquest A1120, (d) | 22.00 |
| Trymen 6607, (d) | 62.46 |
| Eastman EP, a coupling agent/solvent | 107.32 |
| Piccolastic A5, (c) | 64.43 |
| Total Curing Agent | 782.00 |
| % Non Volatile | 73.32 |

| Component | Equivalent Weight | Equivalents |
| --- | --- | --- |
| (a) EPIKURE 3292, amine equivalent source from an amine epoxy adduct | 233 | 1.0875 |
| (a) Heloxy 62, epoxy equivalent source from a cresyl glycidyl ether | 185 | 0.3157 |
| Ratio of epoxy to polyamine/polyamido amine: 1:3.477 | | |

Ex 3 Curative According to the Invention

| Component | Weight (g) |
| --- | --- |
| EPIKURE 3292, (a) | 200.34 |
| Heloxy 62, (a) | 58.40 |
| EPIKURE 3380, (b) | 50.33 |
| EPON 828, (a) | 28.50 |
| Corsamine DO, (c) | 44.13 |
| Jeffamine D2000, (d) | 73.30 |
| Silquest A1120, (d) | 19.92 |
| Trymen 6607, (d) | 47.92 |
| Piccolastic A5, (c) | 64.43 |
| Total Curing Agent | 587.27 |
| % Non Volatile | 86.35 |

| Component | Equivalent Weight | Equivalents |
| --- | --- | --- |
| (a) EPIKURE 3292, amine equivalent source from an amine epoxy adduct | 233 | 0.86 |
| (a) Heloxy 62, epoxy equivalent source from a cresyl glycidyl ether | 185 | 0.3157 |
| (a) EPON 828, epoxy equivalent source from a diglycidyl ether of Bisphenol A. | 188 | 0.152 |
| Ratio of epoxy to polyamine/polyamido amine: 1:1.8 | | |

Paint Formulations (clear)
Ex a)

| Curative of ex 1 | 31.82 |
| --- | --- |
| Eastman EP | 1.30 |
| EPIKURE 3253 | 1.50 |
| EPI-REZ 3520 Epoxy Disp | 75.00 |
| EPI-REZ 3540 Epoxy Disp | 25.00 |
| DI Water | 20.19 |
| Total Clear Paint | 154.81 |
| Paint NV fraction | 0.402 |
| VOC g/l | 221 |

Ex b)

| Curative 2 | 26.55 |
| --- | --- |
| Eastman EP | 0.75 |
| EPIKURE 3253 | 1.5 |
| EPI-REZ 3520 Epoxy Disp | 75.00 |
| EPI-REZ 3540 Epoxy Disp | 25.00 |
| DI Water | 25.19 |
| Total Clear Paint | 153.99 |
| Paint NV fraction | 0.392 |
| VOC g/l | 220 |

Viscosity Measurement Procedure:
Curing agent+Eastman EP or water mixing to homogenize with a spatula, add the epoxy resin in a stoichiometric ratio further mix for 5 minutes with spatula.
Viscosity is measured at 23° C. with a Krebs Unit at t=0, and each hour up to 8 hours.
EPIKURE 8290/EPI-REZ 3520

| Period | At 50% solids |
| --- | --- |
| 30 min | 101 KU |
| 2 h | Visco out of range |
| 3 h | Almost gelled |

Curative 1/EPI-REZ 3520

| period | At 50% solids |
| --- | --- |
| 30 min | 85 KU |
| 7 h | 82 KU |

Curative 2/EPI-REZ 3520

| period | At 50% solids |
| --- | --- |
| 30 min | 55 KU |
| 2 h | 57 KU |
| 7 h | 55 KU |
| 3 days | 54 KU |

Curative 1 has been tested in a zinc rich primer with EPI-REZ 3520/EPI-REZ 3540 resin blend. Viscosity was followed during 28 hours.

| Zinc rich epoxy primer with EPI-REZ ™ Resin 3520-WY-55/3540-WY-55 Zinc dust: 66% SWR VOC: 282 g/l | |
| --- | --- |
| | Weight, g |
| Part A | |
| Curative 1 | 65.65 |
| Eastman EP | 56.88 |
| EPIKURE 3253 | 5.82 |
| Zinc dust, 4P16 (Umicore) | 415.41 |
| Aerosil R812 (Evonik) | 23.29 |
| Modaflow (Cytec) | 7.12 |
| TiO2 R960W38 (DuPont) | 19.41 |
| Byk 028 | 1.25 |
| Part B | |
| EPI-REZ 3520-WY-55 | 149.08 |
| EPI-REZ 3540-WY-55 | 50.47 |
| Optiflo H600VF (Southern Clay) | 19.05 |
| Demi water | 186.57 |
| Total | 1000 |

| Potlife, h | Viscosity, KU | Touch dry, h | Cotton dry, h | Thru dry, h |
| --- | --- | --- | --- | --- |
| 0 | 81 | | | |
| 0.5 | 75 | | | |
| 0.75 | 73 | 1 | 8 | 14 |
| 1 | 72 | | | |
| 2.5 | 72 | 0.75 | 4.5 | 10 |
| 4 | 72 | | | |
| 4.5 | 73 | | | |
| 5.25 | 75 | | | |
| 6 | 75 | | | |
| 6.5 | 75 | | | |
| 24 | 74 | | | |
| 28 | 79 | | | |

500 μm DFT, applied with a bar coater

The curative of example 1 was also tested in the following zinc rich primer.

| Zinc rich epoxy primer with EPI-REZ ™ Resin 3521-WY-53 Zinc dust 80% SWR VOC 210 g/l | |
|---|---|
| | Weight, g |
| Part A | |
| Curative 1 | 49.5 |
| Zinc dust, 4P16 (Umicore) | 671.7 |
| Defoamer, BYK012 (Altana) | 1.73 |
| Modaflow (Cytec) | 3.50 |
| Aerosil R812 (Evonik) | 5.52 |
| Eastman EP | 31.3 |
| Raybo 80 (Raybo) | 3.18 |
| Part B | |
| EPI-REZ 3521-WY-53 | 233.5 |
| Total | 1000 |

Hydrogen out gassing of Part A at 23° C. was negligible (no pressure build up in a closed PE bottle during >3 months) and the paste showed no bubbles.

At 23° C., the mixed paint A+B of Curative 1 and EPI-REZ 3521 showed no significant out gassing during application pot life and even up to 11 days. The hydrogen production was nearly not existing for this composition of the invention compared with a standard system based on EPIKURE Curing Agent 8290 and EPI-REZ 5522 (waterborne epoxy resin). As reported above, the system with EPI-REZ 3520 and EPIKURE 8290 is not stable enough to be used (gelled after less than 2 hours).

Curative 1/EPI-REZ 3521 Very little degassing, no visual foam, even after 11 days.

EPIKURE 8290/EPI-REZ 5522, foaming observed after 24h strong degassing at 23° C. was observed.

EPIKURE 8290/EPI-REZ 3520, (as comparative) is foaming immediately at 23° C.

| Time | Curative 1/EPI-REZ 3521 Ml H$_2$/g zinc | EPIKURE 8290/EPI-REZ 5522 ml H$_2$/g zinc |
|---|---|---|
| 0 h | 0 | 0 |
| 2 h | 0 | 0.1 |
| 5 h | 0.01 | 0.3 |
| 20 h | 0.05 | 0.7 |
| 3 days | | 1.33 + blocked tubing |
| 11 days | 0.14 | |

The same primer was applied onto grit blasted steel SA2.5 (for corrosion tests) and QD panels (for drying and conical mandrel tests). Corrosion protection after 1000 hours salt spray exposure was excellent (DFT=30-40 and 50-70 microns, no significant rust at the cross hatch and in the panel field). Drying (by thumb) at 20-30 microns was reached in 15-30 minutes. Conical mandrel test passed successfully (no crack).

To further accelerate drying, the primer was reformulated by adjusting the co-solvent. With 20-30 microns DFT on QD panels, drying was reached in less than 10 to minutes at 23° C.

| Zinc rich epoxy primer with EPI-REZ ™ Resin 3520-WY-55 Zinc dust 80% SWR VOC 210 g/l | |
|---|---|
| | Weight, g |
| Part A | |
| Curative 1 | 52.8 |
| Zinc dust, 4P16 (Umicore) | 669.5 |
| Defoamer, BYK012 (Altana) | 1.73 |
| Modaflow (Cytec) | 3.50 |
| Aerosil R812 (Evonik) | 5.50 |
| IsoPropanol | 24.55 |
| Dowanol PM | 4.3 |
| Dowanol PPh | 2.38 |
| Raybo 80 | 3.17 |
| Part B | |
| EPI-REZ 3520-WY-55 | 232.8 |
| Total | 1000 |

A white primer (see below) was prepared based on an epoxy resin (type-1) dispersion with Curative 1. When this system was applied directly to metal (SA2.5), corrosion results were excellent after 1000 hours salt spray exposure, even when the primer was applied after 7 hours induction (long pot life).

The same white primer was applied as a top coat onto the zinc rich primer based on the same binder system. The zinc rich primer was applied at 30 microns DFT onto grit blasted steel SA2.5, dried for less than 10 minutes at 23° C., then the white coat was applied at 50 microns DFT, giving a total coat of about 80 microns DFT. The complete coating was cured 20 minutes at 70° C. then 2 weeks at 23° C. After 1000 hours salt spray, no rust could be observed at the cross hatch or in the field. After immersion in water for 500 hours, excellent inter coat adhesion was maintained: no failure at the interface of the two coats or between the primer and the substrate.

| White epoxy primer with EPI-REZ ™ Resin 3520-WY-55 Stoichiometry 1:0.8 PVC: 27.7% VOC: 154 g/l | |
|---|---|
| | Weight, g |
| Part A | |
| EPI-REZ 3520-WY-55 | 320.85 |
| Defoamer BYK 012 (Altana) | 2.89 |
| Water | 97.4 |
| Mica S (Aspanger) | 6.90 |
| Ti-Pure R960 (DuPont) | 96.12 |
| Tremin 283-600EST (Sibelco) | 94.38 |
| CAPP (Heubach) | 89.51 |
| Albawhite 80 (Sachtleben) | 64.35 |
| Letdown | |
| EPI-REZ 3520-WY-55 | 106.95 |
| Silquest Silane A 1871 (Momentive) | 7.90 |
| Part B | |
| Curative 1 | 111.81 |
| Flashrust inhibitor L1 (Erbsloh) | 0.95 |
| Total | 1000 |

The above experimental data illustrated clearly that the curative of this invention in combination with reactive epoxy resin dispersions such as EPI-REZ 3521 is storage stable for several hours as clear, pigmented and a zinc rich water based systems.

The invention claimed is:

1. A curing agent for epoxy resins comprising:
   (a) a first amine adduct, which is a reaction product of an amine-terminated intermediate and a monofunctional epoxy compound, wherein the amine-terminated intermediate is prepared by reacting at least one polyamine or polyamidoamine, having at least 3 active amine hydrogen atoms per molecule, and at least one epoxy resin having a functionality of at least 1.5, in a mole ratio of 0.9:1 to 1:10 of an epoxy functionality equivalents to polyamine or polyamidoamine, wherein the excess of the polyamine or polyamidoamine being eliminated, and wherein the monofunctional epoxy compound is present in an amount calculated to react away the primary amines still present in the amine-terminated intermediate,
   (b) an optional second amine adduct which is prepared from a cycloaliphatic alkyl amine or polyamine and an epoxy compound,
   (c) a sterically hindered hydrophobic alkyl amine or diamine, a hydrophobic hydrocarbon resin, or both,
   (d) a component having amino or polyamino polyalkyleneglycol moieties a medium to low molecular weight amino silane, or both, and
   (e) an optional metal powder.

2. The curing agent of claim 1 comprising 2-15 wt % of (a), based on the weight of the curing agent.

3. The curing agent of claims 1-2, wherein the second amine adduct (b) is present, and comprises 2-20 wt % of the curing agent, the wt % based on the weight of the curing agent.

4. The curing agent of claim 1 comprising 2-30 wt % of (c), the wt % based on the weight of the curing agent.

5. The curing agent of claim 1 wherein
   (i) when the compound of (d) is an amino or polyamino polyalkleneglycol moiety the curing agent comprises 2-20 wt % of the amino or polyamino polyalkleneglycol moieties;
   (ii) when the compound of (d) is an amino silane the curing agent comprises 3-10 wt % of the amino silane; or
   (iii) when the curing agent comprises both an amino or polyamino polyalkleneglycol moiety and an amino silane of (d), the amino or polyamino polyalkleneglycol moiety is 2-20 wt% and the amino silane is 3-10 wt % of the curing agent, the wt % based on the weight of the curing agent.

6. The curing agent of claim 1 wherein the metal powder is present and comprises zinc.

7. A water based epoxy resin formulation comprising the curing agent composition of claim 1.

8. The water based epoxy resin formulation of claim 7, wherein the water based epoxy resin formulations is characterized by a volatile organic compound content below 300g/l.

9. A paint, adhesive or sizing application of the water based epoxy resin formulations of claim 7.

10. A paint or coating composition comprising the water based epoxy resin formulation of claim 7 and 15-80 wt % zinc metal powder, the wt% zinc metal powder based on the weight of the paint or coating composition, or 15-95 wt % zinc metal powder, the wt % zinc metal powder based on the weight of the dry applied and cured paint.

11. Cured products comprising the water based epoxy resin formulation of claim 7.

12. A method for preparing a curing agent comprising:
   (a) reacting at least one polyamine or polyamidoamine, having at least 3 active amine hydrogen atoms per molecule, and at least one epoxy resin having a functionality of at least 1.5, in a mole ratio of 0.9:1 to 1:10 of an epoxy functionality equivalents to polyamine or polyamidoamine to produce an amine-terminated intermediate, removing any excess of polyamine or polyamidoamine, then further reacting the amine-terminated intermediate with a monofunctional epoxy compound in an amount calculated to react away primary amines in the amine-terminated intermediate to prepare a first amine adduct,
   (b) optionally adding the first amine adduct obtained in step (a) with a second amine adduct obtained by partially reacting a cycloaliphatic alkyl amine or polyamine with an epoxy compound to obtain an amine adduct blend,
   (c) adding a sterically hindered hydrophobic alkyl amine or diamine, a hydrophobic hydrocarbon resin, or both, to the first amine adduct of step (a) or to the amine adduct blend of step (b) to obtain a second blend,
   (d) further adding a component having amino or polyamino polyalkyleneglycol moieties, a medium to low molecular weight amino silane, or both, to the second blend obtained in step (c) to form a third blend, and
   (e) optionally adding a metal powder to the third blend.

13. Cured products comprising the resin formulation of claim 8.

14. The curing agent of claim 1, wherein the hydrophobic alkyl amine or diamine comprises an alkyl amine blend composed of oleyl amine and oleyl diamine.

15. The curing agent of claim 1, wherein the hydrophobic hydrocarbon resin comprises a polystyrene polymer.

16. The curing agent of claim 1, wherein the polyamino polyalkyleneglycol moieties comprise a liquid amine derived from branched polypropylene oxide or an ethoxylated tallow amine.

17. The curing agent of claim 1, wherein the amino silane comprises an aminopropyltrimethoxysilane.

18. The method of claim 12, wherein the hydrophobic alkyl amine or diamine comprises an alkyl amine blend composed of oleyl amine and oleyl diamine and wherein the hydrophobic hydrocarbon resin comprises a polystyrene polymer.

19. The method of claim 12, wherein the polyamino polyalkyleneglycol moieties comprise a liquid amine derived from branched polypropylene oxide or an ethoxylated tallow amine.

20. The method of claim 12, wherein the amino silane comprises an aminopropyltrimethoxysilane.

* * * * *